United States Patent Office 2,765,631
Patented Oct. 9, 1956

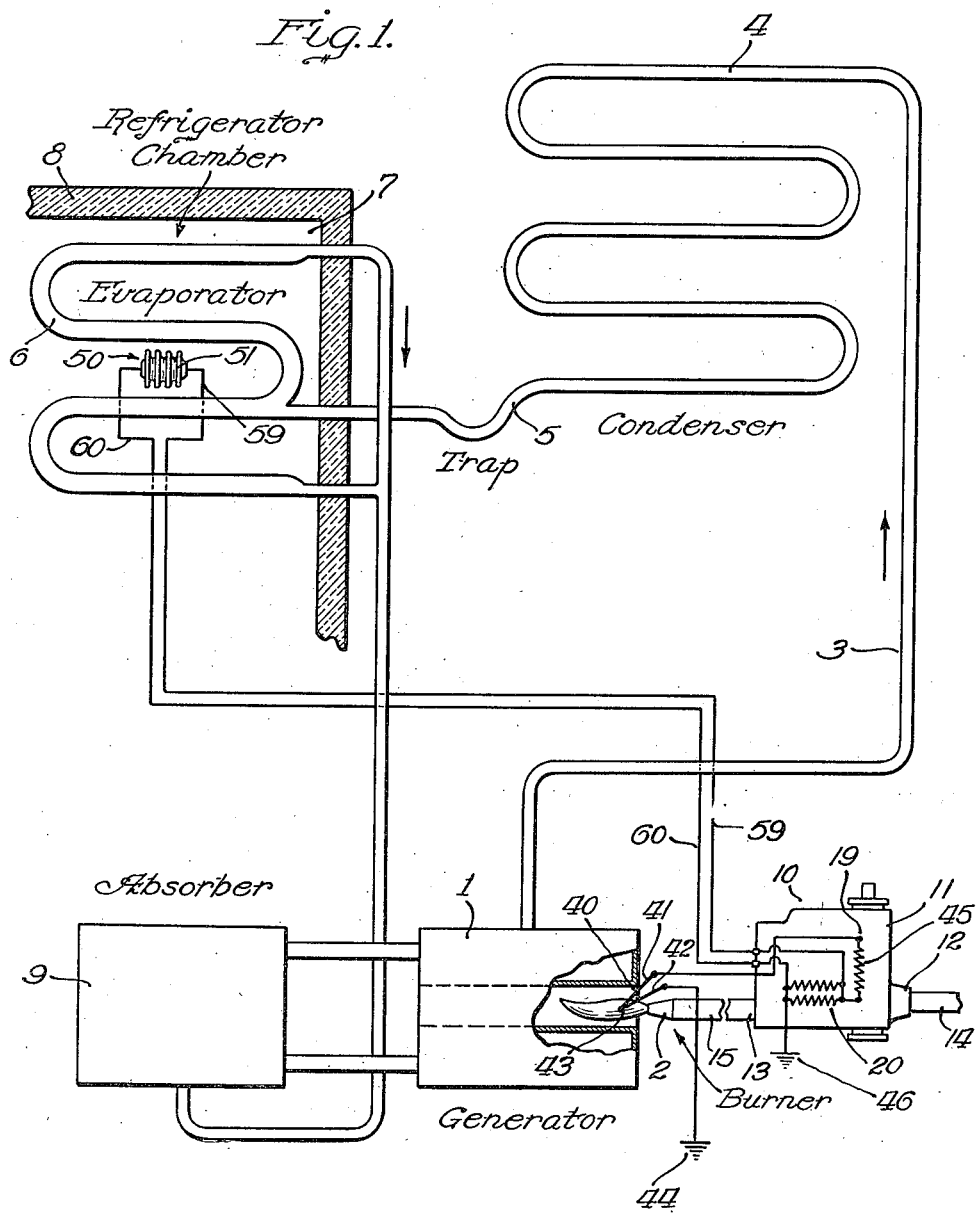

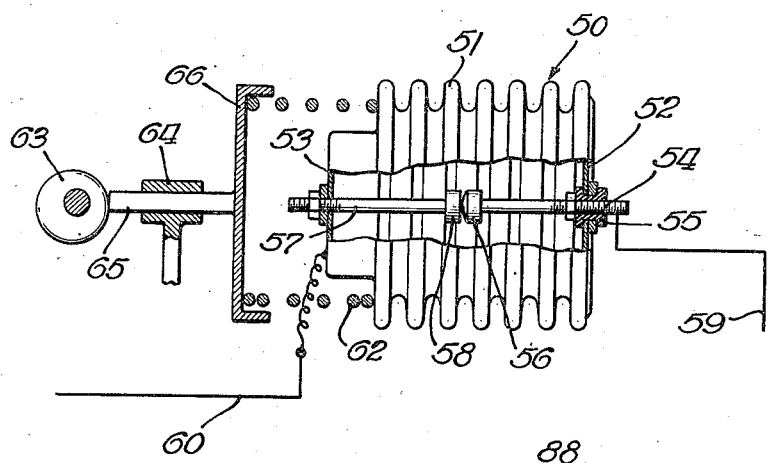
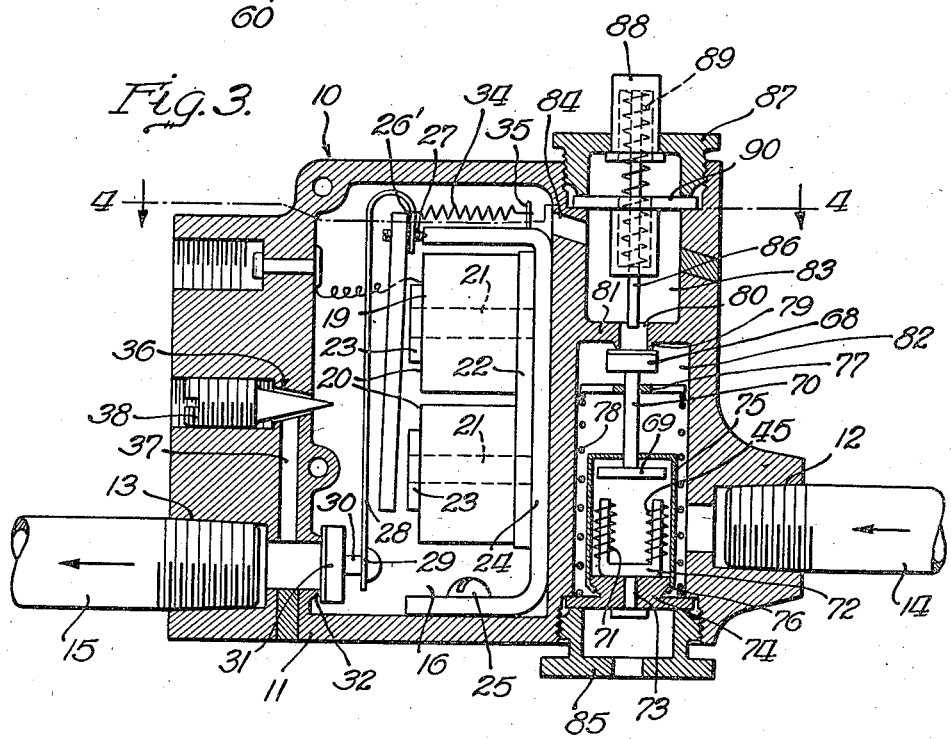

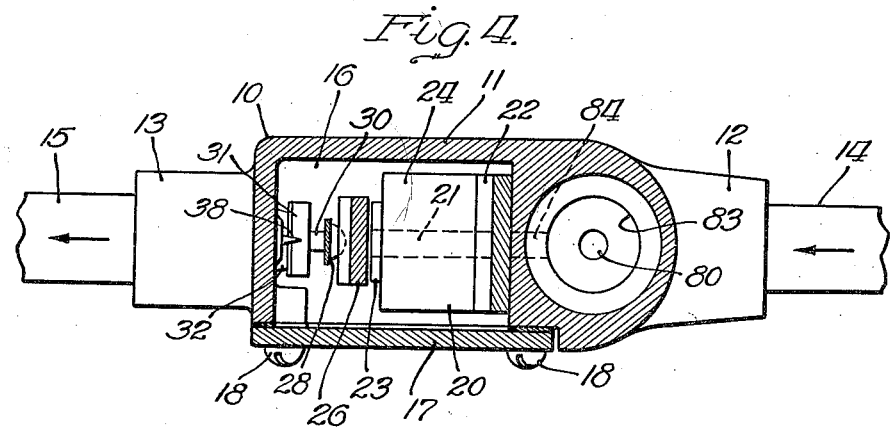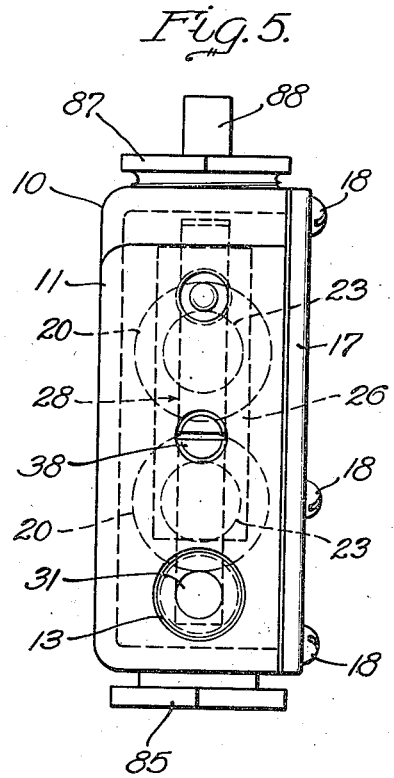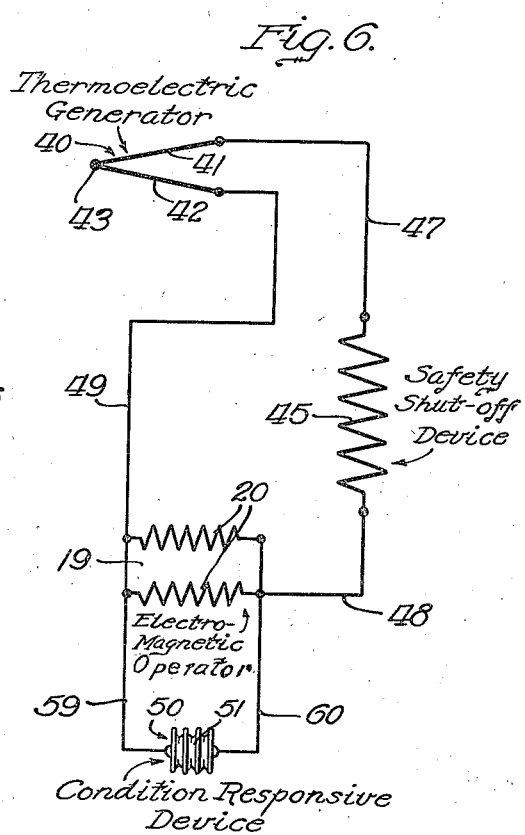

2,765,631
CONTROL APPARATUS FOR FLUID FUEL BURNING APPARATUS AND THE LIKE

Gerald E. Dietz and Adolph J. Hilgert, Milwaukee, Wis., assignors to Milwaukee Gas Specialty Company, Milwaukee, Wis., a corporation of Wisconsin Application July 16, 1952, Serial No. 299,274

8 Claims. (Cl. 62—5)

This invention relates, in general, to control apparatus, and has particular relation to control apparatus which is adapted to be powered by a source of small electric energy such as a single thermocouple or a thermopile or the like, and has particular utility in controlling, for example, absorption type refrigerators burning fluid fuel.

One of the main objects of the present invention is to provide an improved form of control apparatus for fluid fuel burning apparatus and more particularly temperature control apparatus for refrigerators and the like which is powered solely by its own source of electric energy such as that provided by a single thermocouple or thermopile or similar source of small electric energy, and provides for electrically and directly operating a valve for automatically controlling the flow of fuel, for example, to a burner for a refrigeration generator responsive, for example, to changes in temperature or similar condition.

Apparatus of the aforementioned character provides the desired condition or temperature responsive control without the assistance of fluid pressure and without an external source of electric current. The elimination of the necessity of an external source of electric current permits operation of the apparatus where an external source of electric current is not available or where it has failed and it eliminates dependence on an electric utility for operation of the apparatus. The necessity for an electrician's service in installation is also eliminated and costly and not too dependable electric control components such as transformers and the like are not required. Additional fluid flow controls necessary where the assistance of fluid pressure is required in obtaining the desired control are also eliminated and the apparatus is not subject to leakage or other improper functioning of such additional fluid flow controls.

Moreover, control apparatus of this character has implicit therein a fail-safe aspect in that if the source of small electric energy fails (i. e., if a burner which heats a thermoelectric generator to provide the small electric energy is extinguished), the apparatus automatically shuts off, for example, the flow of fuel to the burner thereby providing a safety function for the burner and at the same time affording temperature responsiveness without the necessity of other control devices in the fuel stream and without the necessity of an external source of electric current.

Apparatus of this character also eliminates the necessity of manually resetting the valve and the foregoing functions are provided in an all-electric apparatus wherein the valve is actuated, for example, for controlling the flow of fuel to the burner electrically and directly from the source of thermoelectric current or similar small electric energy as distinguished from actuation of such a valve through a relay of the diaphragm valve type or electrically by an external source of electric energy.

Another object is to provide fluid flow control apparatus of the character set forth wherein there is an electromagnetic operator powered by a source of small electric energy which acts electrically and directly to open a valve for controlling flow of fluid at a higher temperature and is deenergized for movement of such valve to closed position at a lower temperature.

Another object is to provide electromagnetically operated apparatus of the character set forth wherein there is a valve for controlling the flow of fluid, an electromagnetic operator for actuating the valve directly, a thermoelectric generator or similar source of small electric energy for energizing the operator and actuating the valve, and condition responsive means in circuit with the source of small electric energy affording a shunt around the operator upon occurrence of a condition to effect deenergization of the operator and closure of the valve.

Another object is to provide apparatus of the character set forth wherein there is a second electromagnetic device energized from the source of electric energy for maintaining a second valve open as long as the source of electric energy is effective to energize the electromagnetic device and wherein upon failure of the source of electric energy the electromagnetic device is deenergized and the second valve operates to closed position; more particularly, a second electromagnetic device energized from the source of electric energy for terminating operation of the cooling means upon failure of the source of electric energy.

Another object is to provide refrigerator temperature control apparatus wherein there is means for effecting cooling of the refrigerator operable to effect such cooling at two rates, an electromagnetic device controlling the cooling means having two positions corresponding to the two rates, a low voltage source of electric energy for energizing the electromagnetic device, the latter assuming one of the two positions when energized and the other of the two positions when deenergized, and means responsive to the temperature of the refrigerator in circuit with the electromagnetic device to control energization thereof from the source in response to changes in the temperature; more particularly, flow controlling means for effecting flow of fuel to a refrigeration generator at two rates, an electromagnetic operator for the flow controlling means having two positions corresponding to the rates, a thermoelectric generator subject to the heat of the refrigeration generator for energizing the electromagnetic device, the latter assuming one of the two positions when energized and the other of the two positions when deenergized, and means responsive to the temperature of the refrigerator in circuit with the electromagnetic device to control energization thereof from the thermoelectric generator in response to changes in the temperature.

Another object is to provide a control device for fluid fuel burning apparatus wherein there is a first valve for controlling the flow of fuel, an electromagnetic operator for actuating the valve directly, a thermoelectric generator adapted when heated by burning of the fuel to afford a source of electric energy for energization of the operator and actuation of the valve, a by-pass around the valve affording a small flow of fuel regardless of whether the valve is open or closed, and condition responsive means in circuit with the operator to control energization thereof and hence actuation of the valve in accordance with the condition.

Another object is to provide a control device of the aforementioned character wherein there is safety shutoff means comprising a second valve controlling flow of fuel through both the first valve and the by-pass and further comprising an armature operatively connected to the second valve and an electromagnet also energized by the thermoelectric generator and adapted when so energized to maintain the armature in attracted position and the valve open.

Further objects and advantages and numerous modifications and adaptations of the invention will appear from the following detailed description taken in connection with the accompanying drawings.

In the drawings:

Figure 1 illustrates somewhat schematically a refrigerator temperature control apparatus powered by a source of small electric energy and embodying the present invention;

Figure 2 is an enlarged view of the temperature responsive means with the enclosure thereof partially broken away to reveal the internal contacts and showing schematically one form of illustrative means for varying the temperature range setting of the temperature responsive means;

Figure 3 is a longitudinal sectional view through the body or housing for the electromagnetic operator and valve operated thereby and the safety shut-off valve;

Figure 4 is a sectional view taken on the line 4—4 of Figure 3;

Figure 5 is an end view of the housing shown in Figure 3; and

Figure 6 is a circuit diagram showing one suitable circuit for apparatus according to the present invention.

Referring to the drawings, the refrigerator apparatus schematically illustrated in Figure 1 is an absorption or gas refrigerator apparatus comprising, for example, a generator 1 wherein, for example, ammonia gas is released from water by means of heat from a burner 2. The hot gas passes through a tube 3 to a condenser 4 where the ammonia vapor liquifies before passing through a tube 5 to the freezing coil or evaporator 6 which is located within the refrigerator chamber 7 defined, for example, by a wall 8. As well known in the art the ammonia, for example, in the presence of hydrogen gas evaporates in the evaporator 6 with absorption of heat from the chamber 7 which cools or refrigerates the same. The mixture of ammonia and hydrogen gases flows, for example, through a gas heat exchanger (not shown) to an absorber 9 where the ammonia is absorbed in water. The ammonia absorbed in water returns to the generator 1 and the cycle is repeated.

The control device 10 selected for illustration comprises a body or housing 11 having as shown in Figure 3 a gaseous fuel inlet 12 and a gaseous fuel outlet 13. A fuel supply pipe section 14 is connected to the inlet 12 and a fuel supply pipe section 15 is connected to the outlet 13 and leads to the burner 2 for supplying fuel thereto.

The housing 11 has a chamber 16 closed by a cover 17 secured to the housing by screws 18. The chamber 16 contains the low power electromagnetic operator 19 which may be of the character described in the copending application of Gerald E. Dietz and Adolph J. Hilgert, Serial No. 292,498, filed June 9, 1952, and comprises, in general, coil portions 20 wound around a pair of core pieces 21 and between a pole piece 22 common to both core pieces 21 at one end and a pair of pole pieces 23 one at the opposite end of each core piece 21. The structure of the power unit of the electromagnetic operator, particularly in respect of the pole pieces, core posts, movable armature, coil portions and thermocouple connected in circuit with the coil portions as will hereinafter appear, may be of the form more fully described and illustrated in the copending application of Donley S. Collins, Gerald E. Dietz and Adolph J. Hilgert, Serial No. 249,778, filed October 4, 1951. Suffice it for purposes of the present application to state that the core preferably has enlarged pole pieces provided with coaxial openings; that the core posts preferably have their opposite ends expanded into the openings and thereafter heat treated to deform and join the grains of metal so that the pole pieces and posts are in substantially one piece; that the coil is wound around the posts and between the pole pieces; that the movable armature is preferably at least equal in area to the pole faces of adjacent pole pieces; and that the thermocouple to be presently described is connected in circuit with the coil.

The assembly comprising the core pieces 21, coil portions 20 and pole pieces 22 and 23 is carried by one arm of a fulcrum bracket 24 which is secured, for example, at 25 to the inside of the housing 11. The armature 26 is pivoted by pointed screws 27 on the adjacent end of another arm of the bracket 24 and carries a flexible spring valve disc arm 28 or a valve disc arm having a flexible spring section. The arm 28 is secured to the armature 26 at 26' and may be formed of Phosphor bronze or the like.

The free end of the flexible spring arm 28 is connected at 29 to the steam 30 of a valve member 31. The valve member 31 cooperates with a valve seat 32 at the inner end of the outlet 13 to control the main flow of fuel to the burner 2. The armature 26 is actuated to retracted position with accompanying movement of the valve member 31 to closed position by a coiled spring 34 connected, for example, between a bracket or lug 35 on the bracket 24 and the armature 26.

The valve member 31 is thus carried by the spring arm 28. The spring arm 28, the action of which will be further described in connection with the description hereinafter of the operation of the apparatus, constitutes energy storing means connected to the valve member 31 and reacting in a direction for moving this valve member to open position from its seat 32. The energy stored by the spring arm 28 through the connection 26' increases in the movement of the armature 26 to the electromagnet responsive to energization thereof, and the energy stored in the spring arm 28 by movement of the armature to the electromagnet becomes effective for moving the valve 31 to open position when the armature 26 approaches its fully attracted position.

The spring 34 biases the valve member 31 to closed position and, in conjunction with the pressure of the fluid flowing through the valve, provides the necessary sealing force to prevent leakage of the valve. The spring 34 also provides force for overcoming the residual magnetism of the operator 19 upon deenergization thereof for retraction of the armature 26 and closure of the valve. It will be apparent that the force exerted by the spring 34 on the one hand must not be greater than the power available from the operator 19 when the armature 26 is being attracted or the valve cannot be opened; while, on the other hand, the force of the spring 34 must be great enough to overcome residual magnetism of the operator 19 upon deenergization thereof for closure of the valve, and great enough to provide necessary sealing force to the valve member 31 when in closed position.

The control device 10 has a by-pass around the valve 31 which comprises a tapered port 36 opening from the chamber 16 and a passageway 37 opening from the port 36 to the outlet 13 posterior of or beyond the valve seat 32. A by-pass adjustment screw 38 is screwed into the housing 11 and has a pointed or tapered inner end which cooperates with the port 36 and by screwing the screw inwardly or outwardly is adapted to adjust (i. e., increase or decrease) the by-pass flow of fuel around the valve 31. The by-pass passage affords a small flow of fuel to the burner 2 regardless of whether the valve 31 is open or closed. The lesser flow of fuel to the burner 2 through the by-pass when the valve 31 is closed maintains a burner flame for effecting cooling at one (i. e., a lesser) rate. The cooling at this rate may be substantially negligible or in any desired amount. The greater flow of fuel to the burner through the outlet 13 when valve 31 is open maintains a burner flame for effecting cooling at another (i. e., greater) rate.

The valve operator 19 is powered by a single thermocouple 40 heated by the burner 2 as shown in Figure 1 although a thermopile or other source of small electric energy may be employed. The thermocouple comprises dissimilar thermocouple elements 41 and 42 joined at 43 to form a "hot" junction which is heated by the burner flame. One side of the thermocouple 40 may be grounded as shown at 44 in Figure 1. The other side of the thermocouple 40 is connected through the coil 45 of the electromagnet of a safety shut-off device (to be presently described) to the coils 20 of the power unit or operator 19 the other sides of which coils may be grounded at 46. In Figure 6 thermocouple element 41 is shown connected to one side of the coil 45 of the electromagnet for the safety shut-off device by a conductor 47. The other side of the coil 45 is connected by a conductor 48 to the coils 20 the other sides of which are shown connected by a conductor 49 to the other thermocouple element 42. In either case the coils 20 and coil 45 are connected in series circuit relation in the thermocouple or other small electric energy circuit.

Assuming the thermocouple 40 is generating electricity for supply to the valve operator through the aforedescribed circuit, the coils 20 will be energized and the armature 26 attracted to the pole pieces 23. Initial movement of the armature and the force resulting therefrom is not, however, immediately applied to the valve 31 but rather is stored in the flexible spring section of the arm 28. Only when armature travel has reduced the air gap to a point affording greater available magnetic pull and a point at which such pull and the force stored in the flexible section of the arm 28 is sufficient to overcome the sealing force of the valve member 31 is the latter put into motion and pulled away from the valve seat 32 with a snap, the energy stored in the spring arm 28 or the flexible section thereof being released.

From the foregoing it will be apparent that the present invention employs an electromagnetically operated valve of greatly increased efficient utilization of the power available, for example, from a single thermocouple or other source of small electric energy to afford the valve sufficient capacity for use in controlling flow of fluid to the burner.

The fluid flow control apparatus thus far described may, if desired, be controlled by a condition responsive device 50 in shunt with the electromagnetic operator 19 and affording a shunt around the operator upon occurrence of a condition (i. e., upon the occurrence of the desired lower temperature) to effect deenergization of the operator 19 and closure of the valve 31. In view of the small amount of power available from the thermoelectric source of electric energy, any such condition or temperature responsive device utilized must, of necessity, be a device which utilizes a minimal amount of power. It, therefore, should be of low resistance and preferably should not include mechanical means such as, for example, snap action mechanisms, which require power to actuate, nor should it include "anticipating" means which also require power. It should, nevertheless, afford high sensitivity and low differential.

Such a device is shown in Figure 2 which is in the form of a temperature responsive device, in general, of the character more fully disclosed and claimed in the copending application of Adolph J. Hilgert, Serial No. 265,445, filed January 8, 1952, now Patent No. 2,719,201. This device comprises a hermetically sealed expansible and contractible bellows or enclosure 51 closed at one end by a base plate 52 and at the opposite end by a movable end plate 53. A contact stem 54 insulated from the base plate 52 by an insulator 55 extends into the bellows or enclosure 51 and has at its inner end a contact 56 having a rounded inner end forming one of the contacts within the enclosure.

A second contact stem 57 is carried by the movable end 53 of the bellows 51 and extends into the bellows. Its inner end has a contact 58 which contacts the contact 56 and forms the other contact within the bellows. The outer end of the contact stem 54 and the contact stem 57 are connected in circuit with the thermoelectric generator 40, for example, by conductors 59 and 60 as shown in Figures 1 and 6 so as to afford a shunt around the operator 19 upon the occurrence of the condition to effect deenergization of the operator 19 and closure of the valve 31.

The temperature responsive means may include range adjusting means comprising, for example, spring loading means 62 adapted to bear against the movable end of the bellows 51 and rotatable cam means 63 for varying the rate of spring loading and hence the temperature setting of the device. A guide 64 may be provided for the stem 65 which cooperates with the cam 63 and carries the abutment member 66 between which and the movable end of the bellows 51 the spring loading means 62 is interposed.

The enclosed contacts 56 and 58 of the temperature responsive device 50 are immersed in a volatile fluid which fills the bellows or enclosure 51. This volatile fill expands and contracts or has its vapor pressure changed with accompanying expansion and contraction of the bellows and accompanying movement of the contact 58 relative to the contact 56 upon rise and drop in the temperature within the refrigerator chamber 7 in which the temperature responsive device 50 is disposed as shown more or less diagrammatically in Figure 1.

Illustrative of above-atmospheric fills which may be utilized as the volatile fill for the temperature responsive device 50 of the instant application are propane, dichlorodifluoromethane (Freon 12), sulphur dioxide, isobutane, and monochlorodifluoromethane (Freon 22). While these fills, as above indicated, are merely illustrative, they are suitable fills which are above-atmospheric in the ambient temperature to which they are subjected (i. e., the operating temperature range, for example, within the refrigerator chamber 7). Being above-atmospheric fills they afford a fail-safe feature to the apparatus in the sense that if the bellows 51, for example, springs a leak or otherwise loses fill, the contacts will be made, or the pressure of contact 58 against contact 56 increased, and the shunt around the electromagnetic operator will thus be completed, thereby closing the main valve 31 but still maintaining refrigeration at the low rate due to the by-pass of gaseous fuel through the by-pass 36, 37.

If fail-safe operation in the sense of continuing refrigeration at the higher rate is desired, sub-atmospheric fills, which upon leakage at the bellows 51 or other loss of fill will open the contacts or reduce the contact pressure, may also be utilized. Illustrative of sub-atmospheric fills which are suitable are butane, ethyl chloride ($C_2H_5Cl$), dichloromonofluoromethane (Freon 21), and isopentane. Being sub-atmospheric in the ambient temperature to which they are subjected, these fills afford a fail-safe feature to the apparatus in the sense that if the bellows 51 springs a leak, or otherwise loses fill, the contacts will be opened, or the contact pressure reduced, and the shunt circuit around the electromagnetic operator will be opened, thereby opening the main valve 31 for maintenance of refrigeration at the higher rate. This may be desirable where the refrigerating means is a freezer or the like and it is of concern to maintain foods in a frozen condition in the event of bellows failure.

The contacts 56 and 58 are at all times immersed and bathed in the volatile fluid and kept clean and out of contact with surrounding atmospheric conditions so that they will not be deleteriously affected thereby.

The temperature responsive device 50 with its enclosed contacts 56 and 58 immersed in a volatile fill provides slow-make, slow-break contacts in the thermoelectric circuit and as utilized in the apparatus of the present application may function as a variable resistance in the thermoelectric circuit, since in view of the small electric energy involved, the thermoelectric circuit and hence the electromagnetically controlled valve 31 may be automatically controlled responsive to changes in temperature by merely varying the contact pressure of the contact 58 against the contact 56. Even if the circuit actually had to be opened to cause the electromagnetic control device to pick-up, the slow-make, slow-break characteristics will afford certain differential advantages. The enclosed contacts immersed in the volatile fill within the bellows or enclosure on one hand, by protecting the contacts and preventing oxides or other layers tending to create contact resistance, make actuation of the electromagnetic control device 19 by the low power circuit possible while, on the other hand, the low power circuit (which eliminates arcing at the contacts when opened or when at low contact pressure permits drop-out of the electromagnetic control device) makes possible the enclosure of the contacts within the bellows or enclosure without breaking down the volatile fill. The low contact resistance in the temperature responsive device 50 has particular importance in the instant application in obtaining the desired effective shunting of the electromagnetic operator 19.

All of the foregoing adds up to an apparatus in which the differential required to pick-up and drop-out the electromagnetic control device, neglecting thermal lag of the temperature responsive means, is dependent solely upon the electric constants of the apparatus, that is, the pick-up and drop-out values of the electromagnetic control device in relation to the contact pressure in the condition responsive means. The inherent differential is so minimal as to be within the thermal lag range of the temperature responsive device which in and of itself is much lower than in previously known devices. This is so because this differential is an electrical and not a mechanical one as, for example, inherent in snap-acting temperature responsive means necessary where higher powered circuits are involved and contacts must be broken quickly to minimize arcing. In the latter type of device, the differential not only includes manufacturing tolerances in the mechanism but also an air gap between the contacts which varies as the contacts wear in use.

The inherent differential required to pick-up and drop-out the electromagnetic control device is not only minimal and constant over the life of the apparatus but is easy to maintain from apparatus to apparatus in production since the pick-up and drop-out values of the electromagnetic control device are easily maintained and calibrated. Moreover, the temperature differential of the apparatus (neglecting negligible rate of change of vapor pressure throughout the operating temperature range) may remain constant through the operating temperature range since the differential is independent of the relative position of the contacts and may be dependent only upon contact resistance as determined by contact pressure in relation to the inherent differential of the electromagnetic control device. The encapsulation of the contacts inside the bellows or enclosure assures constant resistance for given contact pressures and thus the temperature responsive means aside from the thermal lag therein does not contribute to the temperature differential and the contact resistance if variable at all merely shifts the range of the device which may be readily adjusted, for example, by a factory range adjustment (not shown). Thus the apparatus of the present application affords greater sensitivity and quickness of response and provides a minimum of differential which remains constant throughout the life of the apparatus and remains constant regardless of the temperature setting.

If a leak occurs, for example, at the bellows 51 or if the bellows otherwise loses fill, with an above-atmospheric fill the contacts will be made or the contact pressure increases as previously indicated and the shunt around the electromagnetic operator will be completed, thereby closing the main valve 31 but still maintaining refrigeration at the low rate. On the other hand, with a sub-atmospheric fill if the bellows leaks or loses fill the contacts will be opened or the contact pressure reduced and the shunt circuit around the electromagnetic operator will be opened, thereby opening the main valve 31 for maintenance of refrigeration at the higher rate.

Where a second electromagnetic device energized from the source of small electric energy is desired for terminating operation, for example, of the cooling means upon failure of the source of small electric energy, it may comprise a second valve 68 controlling the flow of fuel through both the port controlled by the first valve 31 and the by-pass and further comprising an armature 69 operatively connected to the second valve, for example, by a stem 70 and an electromagnet 71 also energized by the thermoelectric generator 40 and adapted when so energized to maintain the armature 69 in attracted position and the valve 68 open. Upon extinguishment of the flame of the burner 2 the electromagnet 71 is deenergized and the valve closes and shuts off the flow of fuel both through the port controlled by the valve 31 and through the by-pass passageway 36, 37.

The coil 45 of the electromagnet 71 is connected in circuit with the thermocouple 40 and in series circuit relation with the coils of the electromagnetic operator 19 as previously described. The magnet frame 72 of the electromagnet 71 around the legs of which the coil portions 45 are wound is secured at 73 to a terminal bushing 74. A cup or enclosure 75 encloses the electromagnet 71 and armature 69 and may be secured to the bushing 74, for example, by spinning it into engagement with the bushing at 76. The stem 70 has reciprocatory movement through an opening in the adjacent end wall of the cup 75 and has fixed thereon an abutment member 77 between which and a flange at the outer end of the bushing 74 a coiled spring 78 is interposed. The spring 78 is tensioned when the armature 69 is in attracted position and acts when the electromagnet 71 is deenergized to actuate the armature 69 to retracted position and the valve 68 to closed position against an annular valve seat 79 at the adjacent end of a port 80 which opens, when valve 68 is open, through a transverse wall 81 from a chamber 82 within the control body 11 to a chamber 83 on the opposite side of the wall 81. The gaseous fuel inlet 12 opens into the chamber 82 and the chamber 83 opens into the chamber 16 through a port or opening 84.

The cup 75 with the electromagnet therein is mounted within the chamber 82, for example, by clamping the flange of the bushing 74 against a shoulder at the adjacent end of the chamber 82 by a nut 85 screwed into the body 11. A reset stem 86 extends, for example, for reciprocatory movement out through a nut 87 screwed into the body 11. The outer end of the stem 86 is provided with a reset button 88 and a spring 89 coiled, for example, about the stem 86 and interposed between the button 88 and an abutment 90 clamped in place by the nut 87 acts to move the reset stem 86 to retracted position as shown in Figure 3.

With the valve 68 closed and armature 69 in retracted position, the armature 69 may be actuated to attracted position and the valve 68 to open position by manually pressing the button 88 inwardly. This causes the inner end of the stem 86 to engage the valve 68 and actuate same to open position and armature 69 to attracted position. If the electromagnet 71 is energized, for example, by the thermocouple 40 or other source of small electric energy, it will hold the armature 69 attracted thereto and the valve 68 in open position. Then, when the button 88 is released, the spring 89 returns the button and reset stem to retracted position.

The operation of the embodiment of the invention selected for illustration is as follows:

With the button 88 pressed inwardly and holding the armature 69 in attracted position and valve 68 open, gas enters the chamber 82 at 12 and flows through port 80, chamber 83, port or opening 84, chamber 16, port 36, passageway 37 and outlet 13 to the burner 2 at a relatively low rate to maintain, when the burner is ignited, a relatively low flame at the burner. Upon energization of the electromagnet 71 by the heat of the burner flame on the thermocouple 40, the armature 69 is held attracted to the electromagnet 71 with the valve member 68 in open position and reset button 88 may be released.

When the refrigerator temperature (i. e., the temperature within the refrigerator chamber 7) rises above that set, for example, by the cam 63, the bellows 51 expands and, for example, reduces the pressure of the contact 58 against the contact 56 at least to where the resistance of the shunt circuit which includes the temperature responsive device 50 causes all of the thermocouple current or other small electric energy to pass through the coil portions 20 of the electromagnetic operator 19. This energizes the operator 19 from the thermocouple 40 and the operator actuates the armature 26 to attracted position to actuate the valve 31 to open position as previously described. The opening of the valve 31 increases the rate of flow of gaseous fuel to the burner 2 to provide and maintain a relatively high flame at the burner 2. The high and low flames may operate to effect cooling of the refrigerator at two rates but it is to be understood that the rate of cooling effected by the low flame may, if desired, be relatively inappreciable or the low flame may, if desired. serve merely as a pilot flame.

Upon drop, for example, of the order of a few tenths of a degree Fahrenheit or less in the temperature at the temperature responsive device 50, the bellows 51 contracts under the influence of the loading spring 62. The contact 58 gradually closes against contact 56 and the contact pressure builds up, for example, from about 0 pounds pressure to at least the pressure where the resistance of the shunt circuit which includes the temperature responsive device 50 is reduced to a value at which the shunt circuit and device 50 shunt sufficient of the thermocouple current from the electromagnetic operator 19 to deenergize the operator 19 with resulting actuation of the valve 31 to closed position.

If at any time the flame of the burner 2, which normally should burn constantly, becomes extinguished, thereby creating an unsafe condition, the thermocouple will be deenergized and the flow of energizing electric current in the electromagnet 71 of the safety shut-off device where such device is employed will be discontinued. When this occurs both the valve 31 and the second valve 68 move to closed position, the safety shut-off valve 68 shutting off the flow of fuel ahead of the valve 31 and by-pass 36, 37 in the direction of fuel flow to the burner 2.

The temperature setting of the thermostat or temperature responsive device 50 is achieved, for example, by turning the cam 63 to vary the pressure applied to the bellows 51 by the spring 62.

While a condition responsive device 50 has been shown which increases the pressure of the contact 58 against the contact 56 with a fall in temperature and reduces the pressure with a rise in temperature which device is used in shunt relation with respect to the operator 19, it is to be understood that other temperature responsive devices may be employed within the broader aspects of the invention. For example, a double bellows thermostat, in general, of the character more fully disclosed and claimed in the copending application of Russell B. Matthews, Serial No. 299,118, filed July 16, 1952, may be employed. Such a thermostat by reason of the double bellows construction thereof increases the contact pressure to energize the electromagnetic operator upon a rise in temperature and reduces the contact pressure with a drop in temperature to deenergize the elctromagnetic operator.

The embodiment of the invention shown in the drawings is for illustrative purposes only and it is to be expressly understood that said drawings and the accompanying specification are not to be construed as a definition of the limits or scope of the invention, reference being had to the appended claims for that purpose.

We claim:

1. A control device for fluid fuel burning apparatus comprising, a valve body having a main fuel inlet and a main fuel outlet and having a valve seat intermediate said inlet and outlet, a valve member coacting with said seat and directly controlling main fuel flow from said inlet to said outlet, an electromagnetic operator for actuating said valve member directly, a thermoelectric generator adapted when heated by burning fuel to afford a source of electric energy for energization of said operator and direct actuation of said valve member, a by-pass in said control body affording limited communication between said inlet and outlet to provide continuous flow of a limited amount of fuel from said inlet to said outlet independent of the flow controlled by said valve member, and condition responsive means in circuit with said operator and generator for controlling the energization of said operator and thereby the actuation of said valve member in accordance with the condition, said condition responsive means comprising low resistance contacts encapsulated within an hermetically sealed enclosure.

2. A control device for fluid fuel burning apparatus comprising, a valve body having a main fuel inlet and a main fuel outlet and having a valve seat intermediate said inlet and outlet, a valve member coacting with said seat and directly controlling the main fuel flow from said inlet to said outlet, an electromagnetic operator for controlling said valve member, a thermoelectric generator adapted when heated by burning fuel to afford a source of electric energy for energization of said operator and direct actuation of said valve member, a by-pass in said control body affording limited communication between said inlet and outlet to provide continuous flow of a limited amount of fuel from said inlet to said outlet independent of the flow controlled by said valve member, and electromagnetic safety shut-off means energized by current from said generator and comprising a second valve member in said valve body controlling the flow of fuel from said inlet to said outlet through both said first valve and said by-pass.

3. Condition responsive apparatus for controlling a flow of fluid comprising, in combination, a valve for directly controlling the flow of fluid, an electromagnetic operator for actuating said valve to open position in response to energization of said operator, a thermoelectric generator connected in circuit with said operator and affording a source of electric energy for energizing said operator to cause actuation of said valve, and condition responsive means in circuit with said thermoelectric generator affording a low resistance shunt circuit around said operator upon occurrence of one condition to short-circuit and effect deenergization of said operator and closure of said valve, said condition responsive means eliminating said low resistance shunt circuit from around the operator to effect reenergization of said operator and opening of said valve in response to another condition.

4. Condition responsive apparatus comprising, in combination, a first valve for directly controlling the flow of fuel to a burner, a source of small electric energy, an electromagnetic operator energized by electric energy from said source and acting electrically and directly to operate said first valve to open position in response to energization of said operator, a safety shut-off valve for shutting off all fuel flow to said burner, an electromagnet connected in circuit with said source of small electric energy and in series with said electromagnetic operator and effective when energized to hold said safety shut-off valve in open position, and condition responsive means connected in circuit with said source of small electric energy and in shunt circuit relation with respect to said electromagnetic operator and affording a low resistance shunt circuit around said operator on occurrence of one condition to short circuit and effect deenergization of said operator and closure of said first valve while permitting continued energization of said electromagnet for said safety shut-off valve to maintain said safety shut-off valve open, said condition responsive means eliminating said low resistance shunt circuit from around the operator to effect reenergization of said operator and opening of said first valve in response to another condition.

5. Condition responsive apparatus for controlling a flow of fluid comprising, in combination, a valve directly controlling the flow of fluid, an electromagnetic operator for actuating said valve directly to open position in response to energization of said operator, a thermoelectric generator connected in circuit with said operator and affording a source of electric energy for energizing said operator and actuating said valve to open position, condition responsive means in circuit with said thermoelectric generator affording a low resistance shunt circuit around said operator upon occurrence of one condition to effect deenergization of said operator and closure of said valve, said condition responsive means eliminating said shunt circuit from around said operator to short-circuit and effect reenergization of said operator and opening of said valve in response to another condition, safety shut-off means also energized by said thermoelectric generator and comprising a second valve controlling the flow of fluid, said safety shut-off means, when energized, being adapted to hold said second valve in open position, and a by-pass around said first valve and under the control of said second valve providing continuous flow of a limited amount of fuel independently of said first valve.

6. Refrigeration control apparatus including a low resistance electric circuit wherein the inherent differential of the apparatus is determined solely by the electric constants of the circuit, comprising in combination, a valve for directly controlling flow of fuel to a burner for a refrigeration generator, an electromagnetic operator in said circuit, temperature responsive variable resistance means connected in shunt circuit relation with said operator for directly controlling the energization of said operator, said temperature responsive means comprising low resistance contacts normally biased into continuous engagement and temperature responsive means for varying the contact pressure to vary the contact resistance and thereby the current flow between said contacts, said temperature responsive means affording constant temperature-contact resistance relationships throughout the life of said means, and a source of small electric energy for said circuit, said electromagnetic operator being energized by electric energy from said source and acting electrically and directly to open said valve at values of said resistance above a given value and deenergized to release said valve at resistance values below a given value, the difference between said resistance values being the sole inherent determinant of the differential of the apparatus, thereby affording the apparatus extreme sensitivity to temperature changes.

7. Refrigeration control apparatus including a low resistance electric circuit wherein the inherent differential of the apparatus is determined solely by the electric constants of the circuit comprising, in combination, temperature responsive means for varying the resistance of said circuit to provide different resistance values, said temperature responsive means comprising low resistance contacts normally biased into continuous engagement and temperature responsive means for varying the contact pressure to vary the contact resistance and thereby the current flow in said circuit, said temperature responsive means affording constant temperature-contact resistance relationships throughout the life of said means, a valve for directly controlling flow of fuel to a burner for a refrigeration generator, an electromagnetic operator under direct control of said temperature responsive means, and a source of small electric energy for said circuit, said electromagnetic operator being energized by electric energy from said source and acting electrically and directly to open said valve at a resistance value for a higher temperature and deenergized for closing of said valve at a resistance value for a lower temperature.

8. A control device for fluid fuel burning apparatus comprising, a valve body having a main fuel inlet for connection to a source of fluid fuel and a main fuel outlet for connection to a burner and having a valve seat intermediate said inlet and outlet, a valve member coacting with said seat and directly controlling fuel flow from said inlet past said seat to said outlet, an electromagnetic operator for actuating said valve member directly, a single thermocouple adapted when heated by burning fuel to afford a source of electric energy for energization of said operator and direct actuation of said valve member, a by-pass in said control body affording limited communication within said body between said inlet and outlet to provide continuous flow of a limited amount of fuel through said by-pass and around said seat from said inlet to said outlet independent of the flow controlled by said valve member, and condition responsive means in circuit with said operator and thermocouple for controlling the energization of said operator and thereby the actuation of said valve member in accordance with the condition, said condition responsive means comprising low resistance contacts enclosed with an hermetically sealed enclosure.

References Cited in the file of this patent

UNITED STATES PATENTS

| | | |
|---|---|---|
| 243,345 | Lungen | June 21, 1881 |
| 1,195,269 | Ross | Aug. 22, 1916 |
| 1,822,408 | King | Sept. 8, 1931 |
| 2,097,838 | Karrer | Nov. 2, 1937 |
| 2,126,587 | Thornberry | Aug. 9, 1938 |
| 2,255,413 | Coons | Sept. 9, 1941 |
| 2,261,092 | Peterson | Oct. 28, 1941 |
| 2,274,966 | MacFarland | Mar. 3, 1942 |
| 2,290,047 | Hildebrecht | July 14, 1942 |
| 2,312,479 | Ray | Mar. 2, 1943 |
| 2,337,089 | Ellsworth | Dec. 21, 1943 |
| 2,340,408 | Beach | Feb. 1, 1944 |
| 2,345,505 | Siedle | Mar. 28, 1944 |
| 2,375,569 | McCarty | May 8, 1945 |
| 2,393,427 | Sparrow | Jan. 22, 1946 |
| 2,406,752 | Eskin | Sept. 3, 1946 |
| 2,407,170 | Malek | Sept. 3, 1946 |
| 2,488,209 | Lehane | Nov. 15, 1949 |
| 2,527,286 | Witzel | Oct. 24, 1950 |
| 2,527,308 | Jackson | Oct. 24, 1950 |
| 2,546,912 | Sutton | Mar. 27, 1951 |
| 2,591,870 | Rice | Apr. 8, 1952 |

OTHER REFERENCES

General Controls Catalog, Fall 1941, Catalogue 51, page 11.